June 21, 1932.  G. W. MacKENZIE  1,864,203
ROBOT FOR SIGNALING DEVICES
Filed Nov. 14, 1931   2 Sheets-Sheet 1

INVENTOR
George W. MacKenzie
by William B. Jaspert
attorney.

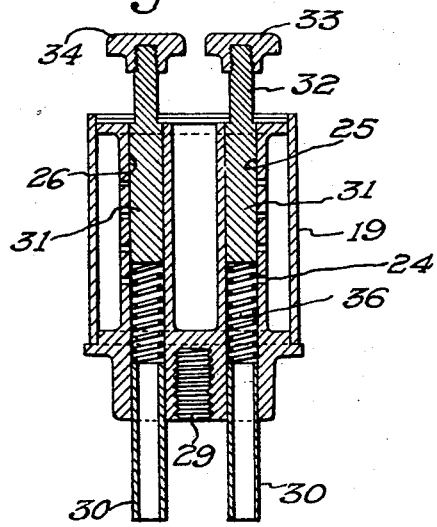
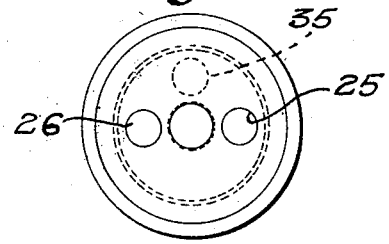
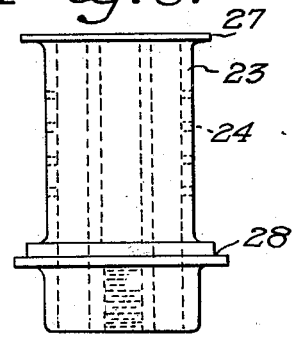
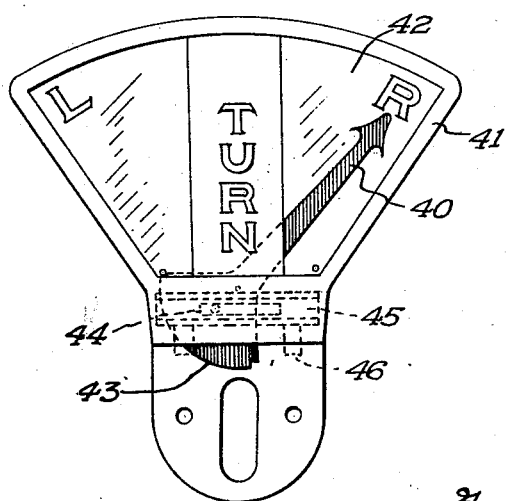

Patented June 21, 1932

1,864,203

UNITED STATES PATENT OFFICE

GEORGE W. MacKENZIE, OF BEAVER, PENNSYLVANIA

ROBOT FOR SIGNALING DEVICES

Application filed November 14, 1931. Serial No. 575,105.

This invention relates to safety signals for automotive vehicles which are adapted to indicate the maneuvers of the vehicle by means of movable indicators, and it is among the objects of the invention to provide a signal of this general character which shall be semi-automatic in its operation and which shall be of simple and durable construction and readily attached to standard makes of vehicles without requiring any substantial changes in standard equipment.

It is a primary object of the invention to provide an indicating signal to be employed at the rear or other convenient portion of an automobile which shall be actuated by the pressures or negative pressures, such as the oil pressure or suction, produced by the engine to which it is applied, and which shall be provided with a control whereby the desired signals may be conveniently given without the aid of lights and independent of the control members employed in the operation of the vehicle.

Figure 1:
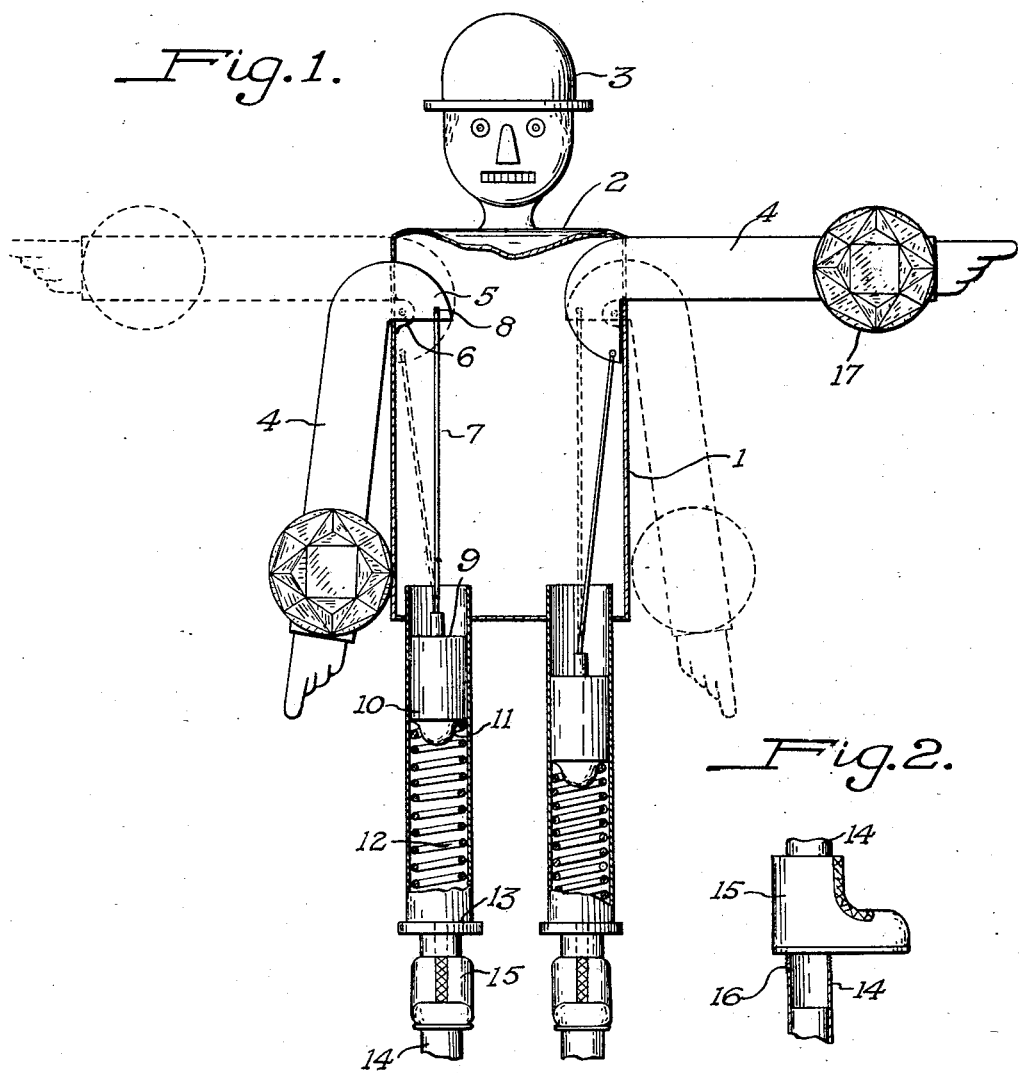
Figure 2:
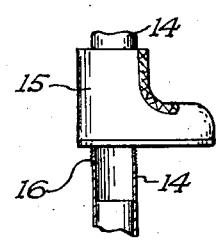
Figure 3:
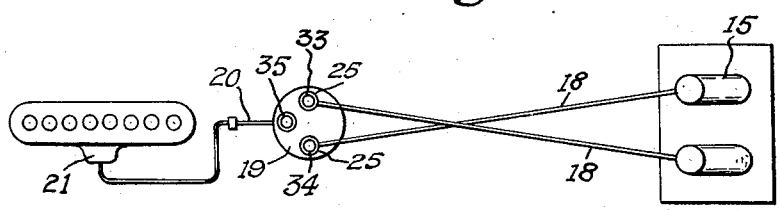

These and other objects of the invention will become more apparent from a consideration of the accompanying drawings constituting a part hereof in which like reference characters designate like parts and in which Figure 1 is a front sectional elevational view of a robot embodying the principles of this invention; Figure 2 a sectional elevation showing one of the robot's feet with tubular attachments therefor; Figure 3 a diagrammatic view illustrating the connections of the robot to the vacuum or suction side of a vehicle motor through a control valve; Figure 4 a vertical cross-sectional view of a control valve embodied in the diagram shown in Figure 3; Figure 5 a top plan view of the interior of the valve structure; Figure 6 a side elevational view thereof; and Figure 7 a directional indicator which is adapted to be operative in accordance with the invention, but which is of an entirely different form than that shown in Figure 1.

With reference to the several figures of the drawings, the structure of Figure 1 comprises a robot having a cylindrical body constituted by a housing 1 to which the top and head portions 2 and 3 may be integrally attached or otherwise joined.

The top of the housing is provided with slots in the region of the shoulders through which the arms 4 project, the arms being flat or round members as desired which are provided with a lever 5 by which the arms are hinged at 6 to one end of the lever. A link 7 is connected at 8 to the lever 5, the link extending downwardly and is connected to a sliding piston 9 which is disposed in a cylinder 10 that constitutes the leg of the robot, there being two cylinders and pistons which respectively function to actuate the arms 4 in a manner to be hereinafter described.

The tubes or hollow legs 10 are open at the top and the pistons 9 are provided with a spring seat 11 for coil springs 12, one end of which abuts against a shoulder 13 at the foot portion of the robot. The spring coils function to normally bias the pistons 9 to their upward position, in which position the arms 4 are in their lowermost position, and the pistons are drawn downwardly against the action of the coil springs 12 by means of a vacuum produced by the suction that draws the fuel and air mixture into the engine and which is applied through tubes 14 extending to the feet 15 of the robot.

This construction of the application of the vacuum through the tube is more clearly shown in Figure 2 of the drawings. The tube projecting below the feet of the robot may be provided with a threaded portion 16 for receiving a screw nut by means of which the robot may be attached to a mounting bracket which may be provided on the tail light of an automobile or which may be adapted for mounting both the robot and the tail light as desired.

The arms of the robot 4 are preferably provided with reflector jewels such as are commonly employed for reflection purposes, the jewels functioning to render the movable arms of the robot more visible at night time.

With reference to Figure 3 of the drawings, the vacuum tubes 14 of the robot are connected by conduits such as rubber tubing 18 to a valve member generally designated at 19, one side of which is connected by a conduit 20 to the intake manifold 21 of the engine motivating the car on which the robot installation is made.

As in the operation of windshield wipers to the vacuum system of the engine, the connection may be made either at the vacuum tank or the intake manifold or on some portion of the carburetor as desired so long as a suction or vacuum is available for operation of the signal.

The valve construction is more clearly shown in connection with Figures 4 to 6 inclusive of the drawings and consists of a cylindrical housing 19 in which is disposed a cylindrical member 23 of Figure 6 having perforations 24 in the wall thereof and having a pair of cylinders 25 and 26 integral therewith. The member 23 is provided with an edge flange 27 and a peripheral shoulder flange 28 on which the cylindrical casing 19 is mounted and the bottom of the member 23 is provided with a screw threaded opening 29 which is adapted to be screwed onto the end of the gear shaft lever in substitution of the usual ball handle which is similarly mounted on the lever. This valve may be mounted at any other point convenient to the driver.

A pair of tubes 30 are connected to the cylinders 26 and form extensions thereof, these tubes being provided to attach the flexible conduits of the vacuum system, namely, the conduits 18 which are connected to the feet of the robot at their opposite ends.

A pair of pistons 31 are disposed in the cylinders 25 and 26 of the valve housing and the pistons are provided with constricted ends 32 having buttons 33 and 34 screwed or otherwise fastened thereon.

As shown in Figure 5, the annular valve chamber on the interior of the cylindrical housing 19 is connected through port 35 by the conduit 20 with the vacuum or suction part of the engine so that the chamber is constantly in communication with the suction source.

The pistons 31 of the valves are normally biased by coil springs 36 to their upper position as shown in Figure 4 in which position the lower perforations or ports 24 of the cylinders 25 and 26 are open to the vacuum chamber of the valve thereby communicating the vacuum through the cylinders or tubes 20 and the conduits 18 to the feet of the robot shown in Figure 1.

The operation of the foregoing described mechanism is briefly as follows: As previously stated, the coil springs 12 in the hollow legs or cylinders 10 of the robot, displace the pistons 9 to their upper position in which position the arms 4 are lowered. This is the position of the robot when the engine has stopped and the vehicle is consequently not in motion.

When the engine is cranked and a vacuum is produced on the intake manifold connection through the conduit 20, the interior of the valve chamber 19 is evacuated and the vacuum is communicated through the lower perforations 24 of the cylinders to the cylinders 10 of the robot thereby drawing the pistons 9 downwardly and causing the arms to be raised to the horizontal position.

By closing the valves of the cylinders 25 and 26, that is, by depressing them against the action of the coil springs 36, the vacuum source is disconnected from the cylinders 10 of the robot and the springs 12 act to push the pistons 9 upwardly thereby causing the arms 4 to drop.

Due to the variation in the strength of the vacuum or suction in response to engine speeds and load conditions, a stronger vacuum will be available when the car is operating at low speed than when it is running at its normal speed on the highway and consequently at low speeds such as those corresponding to the speed of the vehicle in traffic, both of the arms 4 would be raised to the horizontal position. Since the operator would naturally slow down the vehicle if he desired to make a turn, this condition of available vacuum would exist and both arms would be raised. Therefore, by depressing either button 33 or 34 the corresponding arm of the robot will be made to drop.

For example, if the driver is desirous of making a left hand turn, he would press the valve button 34 which would cut off the vacuum from the right hand cylinder or leg of the robot causing the right hand arm to drop and maintaining the left hand arm in its horizontal position, thereby indicating that a left hand turn is to be made and similarly by disconnecting the vacuum for the other arm, a right hand turn would be indicated. The tubes 18 connecting the legs with the valve 19 are crossed for this purpose, as shown in Figure 3.

The robot, shown in Figure 1 of the drawings, is in the position in which it would be viewed from the rear of the vehicle. A right hand turn is indicated since the right hand arm 4 of the figure is in the horizontal raised position and the left hand arm is in its lowered position, this position of the arms being maintained so long as the button 33 is pressed downwardly to disconnect the vacuum from the left leg.

When both of the valve buttons 33 and 34 are released both arms 4 will be in their raised position when the vehicle is operating at a slow speed due to the available suction or vacuum, but as the engine picks up speed, the arms will drop to their lower position due to the failure of the vacuum in the line.

In this respect, the robot signals are semi-automatic in that they will automatically raise both arms to indicate caution or that the vehicle is slowing up and by means of manipulating the valve button either arm can be lowered to indicate the direction of the turn by the arm that is maintained in its raised position.

Also, if desired, the arms of the robot may be agitated quite violently by manipulating the buttons 33 and 34 thus indicating that it is intended to stop or reverse the vehicle.

In Figure 7 of the drawings is illustrated a modified form of the invention which consists of an indicating lever or arm 40 which is operative within a segmental shaped housing 41 in the manner of a scale fulcrum lever.

Housing 41 is provided with a glass cover 42 having a strip painted or placed in the center thereof on which the letters T U R N are painted or printed to designate that the device is adapted to indicate a turn. The corners of the base of the glass or the bottom of the housing are provided with the letters L and R, as shown, to indicate left and right hand turns, and the arm 40 is painted red to render it readily visible.

The bottom of the arm 40 is provided with a counterweight 43 which holds it normally in the vertical position. This counterweight is connected by a slotted opening with a pin 44 that projects through a cylinder designated by the dotted lines 45, the pin being integral with a plunger which is operatively disposed in said cylinder and which is actuated by the vacuum applied through conduits 46. The device is operative similar to the manner of operating the robot by controlling the valve buttons 33 and 34 to indicate a left or right hand turn in the manner explained.

With reference to the robot construction embodied in this disclosure, it will be obvious that any other figure such as a bird with movable wings or a bathing beauty or the like may be employed instead of the arms of the robot with the vacuum means utilized in the same manner as that herein described.

It is also evident that the movable elements of the robot may be constituted movable contacts for energizing light circuits in connection with the operation of the signal if so desired, and that the oil pressure of the engine or other source of fluid pressure may be employed for operating the robot or other signals.

I claim:

1. A signal device for automotive vehicles comprising a movable indicator, conduits normally connecting said indicator to the suction produced by the engine motivating the vehicle, and control means for disconnecting said suction whereby to actuate said movable indicator.

2. A signaling device for automotive vehicles comprising a robot having its arms movable from a vertical to a horizontal position, a plurality of pistons operating in said robot having separate cylinders normally connected to the vacuum side of the motor to hold the arms in horizontal position by the suction of the motor, springs urging said pistons to the position where the arms are normally down, and control means for disconnecting one or both of said cylinders from said vacuum means to lower one or both of said arms to the vertical position.

3. A signaling device for automotive vehicles comprising a movable indicator, piston element for actuating said indicator in response to fluid pressure, spring means normally urging said piston elements to the inactive position of the signal means, and a constant connection between the piston cylinder and a source of vacuum of the vehicle motor for rendering the said signal operative in response to fluctuations in the suction produced on the vacuum side of the motor.

4. A signal device for automotive vehicles comprising a movable indicator, piston actuating means therefor, means normally urging said piston in the non-signaling position of said indicator, valve means connecting said piston cylinder with a source of vacuum of the motivating engine of the automotive vehicle, said valve being normally open to effect communication of the piston cylinder with the vacuum to render said signal operative in response to variations in the vacuum produced by the vehicle motor, and means for disconnecting said vacuum from the signal to render the same inoperative.

5. A signaling device for automotive vehicles comprising a movable indicator having a plurality of actuators connected with the engine motivating the vehicle whereby the indicator is normally held in one indicating position in response to the operation of said engine, and control means operative to selectively disconnect one or all of said actuators from said engine to move said indicator to its other indicating positions.

6. A device for visibly indicating maneuvers of automotive vehicles comprising a signal, operating means for said signal, and an actuator responsive to variations in the fluid pressure created by the vehicle engine for rendering said means operative.

In testimony whereof I have hereunto set my hand.

GEORGE W. MacKENZIE.